US011680534B1

(12) United States Patent
Thombare et al.

(10) Patent No.: US 11,680,534 B1
(45) Date of Patent: Jun. 20, 2023

(54) ROBUST CONTROL OF ROLLING ENGINE START-STOP

(71) Applicants: Papeeha Thombare, West Bloomfield, MI (US); Nandanshri Bagadi, Shelby Township, MI (US); Ryan Masters, Walled Lake, MI (US); Nicholas Hansen, Highland, MI (US); Andre Lorico, White Lake, MI (US); Drushan Mavalankar, Rochester Hills, MI (US); Shuonan Xu, Troy, MI (US)

(72) Inventors: Papeeha Thombare, West Bloomfield, MI (US); Nandanshri Bagadi, Shelby Township, MI (US); Ryan Masters, Walled Lake, MI (US); Nicholas Hansen, Highland, MI (US); Andre Lorico, White Lake, MI (US); Drushan Mavalankar, Rochester Hills, MI (US); Shuonan Xu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/668,459

(22) Filed: Feb. 10, 2022

(51) Int. Cl.
*F02D 41/06* (2006.01)
*F02D 41/04* (2006.01)
*F02N 11/08* (2006.01)

(52) U.S. Cl.
CPC ......... *F02D 41/062* (2013.01); *F02D 41/042* (2013.01); *F02N 11/0814* (2013.01); *F02N 11/0822* (2013.01); *F02N 11/0833* (2013.01); *F02N 11/0837* (2013.01); *F02D 2200/501* (2013.01); *F02D 2200/60* (2013.01)

(58) Field of Classification Search
CPC .............. F02D 41/042; F02N 11/0814; F02N 11/0822; F02N 11/0833; F02N 11/0837
See application file for complete search history.

(56) References Cited

U.S. PATENT DOCUMENTS

| 7,354,379 B2 | 4/2008 | Moriya |
| 8,935,075 B2 | 1/2015 | Otanez et al. |
| 9,045,132 B1 | 6/2015 | Zhao et al. |
| 9,751,516 B2 | 9/2017 | Yu et al. |
| 9,964,090 B2 | 5/2018 | Khafagy et al. |
| 2013/0245925 A1* | 9/2013 | Malone ............... F02N 11/0818 701/113 |
| 2015/0142265 A1* | 5/2015 | Killy ................... F02N 11/0822 701/41 |
| 2015/0291152 A1* | 10/2015 | Mould .................. B60W 40/09 180/65.225 |

(Continued)

*Primary Examiner* — Logan M Kraft
*Assistant Examiner* — Anthony L Bacon
(74) *Attorney, Agent, or Firm* — Ralph E. Smith

(57) ABSTRACT

Rolling engine start-stop (RESS) system and methods for a vehicle include a set of sensors configured to measure a set of operating parameters of the vehicle comprising at least (i) driver input via brake pedal of the vehicle, (ii) vehicle speed, and (iii) a steering angle of the vehicle and a controller configured to, based on the set of operating parameters, determine a target vehicle speed for stopping an engine of the vehicle, and based on the steering angle of the vehicle, selectively stopping the engine of the vehicle when the vehicle speed falls to the determined target vehicle speed, wherein stopping the engine of the vehicle at the determined target vehicle speed decreases noise/vibration/harshness (NVH) caused by stopping the engine.

17 Claims, 3 Drawing Sheets

(56) References Cited

U.S. PATENT DOCUMENTS

| | | | |
|---|---|---|---|
| 2016/0244056 A1* | 8/2016 | Seguchi | B60W 30/12 |
| 2019/0061768 A1* | 2/2019 | Bodendorf | F02N 11/0837 |
| 2020/0062225 A1* | 2/2020 | Kobori | F02N 11/0833 |
| 2020/0173412 A1* | 6/2020 | Meroux | F02D 41/042 |
| 2020/0409326 A1* | 12/2020 | Jiang | G06N 20/00 |
| 2022/0034288 A1* | 2/2022 | Rollinger | F02N 11/0811 |
| 2022/0258727 A1* | 8/2022 | Maruiwa | B60W 60/001 |
| 2022/0314810 A1* | 10/2022 | Yokoo | B60L 7/26 |

\* cited by examiner

ROBUST CONTROL OF ROLLING ENGINE START-STOP

FIELD

The present application generally relates to engine start-stop (ESS) and, more particularly, to techniques for robust control of rolling engine start-stop (RESS).

BACKGROUND

Engine start-stop (ESS) is one of many strategies used to increase vehicle fuel economy and/or decrease vehicle emissions. Engine start-stop is typically performed after the vehicle comes to a complete stop and the driver's foot is on the brake pedal. In conventional engine start-stop systems, there is a stop delay between vehicle shutdown and the moment the engine start-stop decision is being made, which often results in noise/vibration/harshness (NVH) (e.g., a "jerk") that is noticeable and typically unpleasant for at least the driver. Accordingly, while such conventional engine start-stop systems do work well for their intended purpose, there exists an opportunity for improvement in the relevant art.

SUMMARY

According to one example aspect of the invention, a rolling engine start-stop (RESS) system for a vehicle is presented. In one exemplary implementation, the system comprises a set of sensors configured to measure a set of operating parameters of the vehicle comprising at least (i) driver input via brake pedal of the vehicle, (ii) vehicle speed, and (iii) a steering angle of the vehicle and a controller configured to, based on the set of operating parameters, determine a target vehicle speed for stopping an engine of the vehicle, and based on the steering angle of the vehicle, selectively stopping the engine of the vehicle when the vehicle speed falls to the determined target vehicle speed, wherein stopping the engine of the vehicle at the determined target vehicle speed decreases noise/vibration/harshness (NVH) caused by stopping the engine.

In some implementations, the controller is configured to not stop the engine of the vehicle when the steering angle of the vehicle exceeds a steering angle threshold. In some implementations, the steering angle threshold is indicative of a vehicle parking maneuver during which the vehicle could be temporarily obstructed by an obstacle prior to reaching a desired final destination. In some implementations, the target vehicle speed is determined dynamically based on a kinematic equation considering vehicle deceleration rate and maximum delays of a set of actuators for stopping the engine. In some implementations, the controller is configured to schedule the set of actuators to allow stopping of the engine at the dynamically determined target vehicle speed based on individual estimated delays of the set of actuators. In some implementations, the set of actuators comprise at least one of (i) fuel, (ii) spark, (iii) throttle, (iv) purge, (v) engine idle speed, (vi) and transmission state. In some implementations, the target vehicle speed is determined by selecting one of a plurality of predetermined target vehicle speeds. In some implementations, the plurality of predetermined target vehicle speeds comprises (i) four miles per hour, (ii) two miles per hour, and (iii) zero miles per hour. In some implementations, the driver input via the brake pedal of the vehicle comprises (i) a brake pedal pressure/position and (ii) a rate of change of the brake pedal pressure/position.

According to another example aspect of the invention, an RESS method for a vehicle is presented. In one exemplary implementation, the method comprises providing a set of sensors configured to measure a set of operating parameters of the vehicle comprising at least (i) driver input via brake pedal of the vehicle, (ii) vehicle speed, and (iii) a steering angle of the vehicle, based on the set of operating parameters, determining, by a controller of the vehicle, a target vehicle speed for stopping an engine of the vehicle, and based on the steering angle of the vehicle, selectively stopping, by the controller, the engine of the vehicle when the vehicle speed falls to the determined target vehicle speed, wherein stopping the engine of the vehicle at the determined target vehicle speed decreases NVH caused by stopping the engine.

In some implementations, selectively stopping the engine of the vehicle comprises not stop the engine when the steering angle of the vehicle exceeds a steering angle threshold. In some implementations, the steering angle threshold is indicative of a vehicle parking maneuver during which the vehicle could be temporarily obstructed by an obstacle prior to reaching a desired final destination. In some implementations, the target vehicle speed is determined dynamically based on a kinematic equation considering vehicle deceleration rate and maximum delays of a set of actuators for stopping the engine. In some implementations, stopping the engine of the vehicle comprises scheduling, by the controller, the set of actuators to allow stopping of the engine at the dynamically determined target vehicle speed based on individual estimated delays of the set of actuators. In some implementations, the set of actuators comprise at least one of (i) fuel, (ii) spark, (iii) throttle, (iv) purge, (v) engine idle speed, (vi) and transmission state. In some implementations, the target vehicle speed is determined by selecting one of a plurality of predetermined target vehicle speeds. In some implementations, the plurality of predetermined target vehicle speeds comprises (i) four miles per hour, (ii) two miles per hour, and (iii) zero miles per hour. In some implementations, the driver input via the brake pedal of the vehicle comprises (i) a brake pedal pressure/position and (ii) a rate of change of the brake pedal pressure/position.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional engine start-stop systems (ESS) suffer from a stop delay between vehicle shutdown and the moment the engine start-stop decision is being made, which often results in noise/vibration/harshness (NVH) (e.g., a "jerk") that is noticeable and typically unpleasant for the driver. Accordingly, rolling engine start-stop (RESS) systems and methods are presented that dynamically determine a target speed (4 mph, 2 mph, etc.) for an upcoming engine stop operation for optimal fuel economy benefit and vehicle jerk reduction. The target speed for engine stop determination is generally based on the driver intent, as it was discovered that jerk is less noticeable to the driver at higher vehicle speed engine stops and also while the driver is more aggressively applying the brakes.

Once the target speed is known, a time to reach this target speed is determinable for actuator delay accounting. As different engine actuators have different delays, they could be scheduled accordingly (fuel, spark, throttle, purge, etc.). Other input parameters could include steering wheel/accelerator pedal states, road gradient, transmission speed/gear, and the like. Potential benefits in addition to fuel economy and reduced vehicle jerk could include fewer nuisance start-stop events by monitoring and delaying entry into rolling stop events based on the driver's brake pedal modulation. Steering wheel angle could also be used to selectively inhibit rolling engine start-stops, such as in parking scenarios (garage, public parking lots, etc.) where something (e.g., a bystander) may temporarily interrupt the driver's maneuvering of the vehicle.

Figure 1:
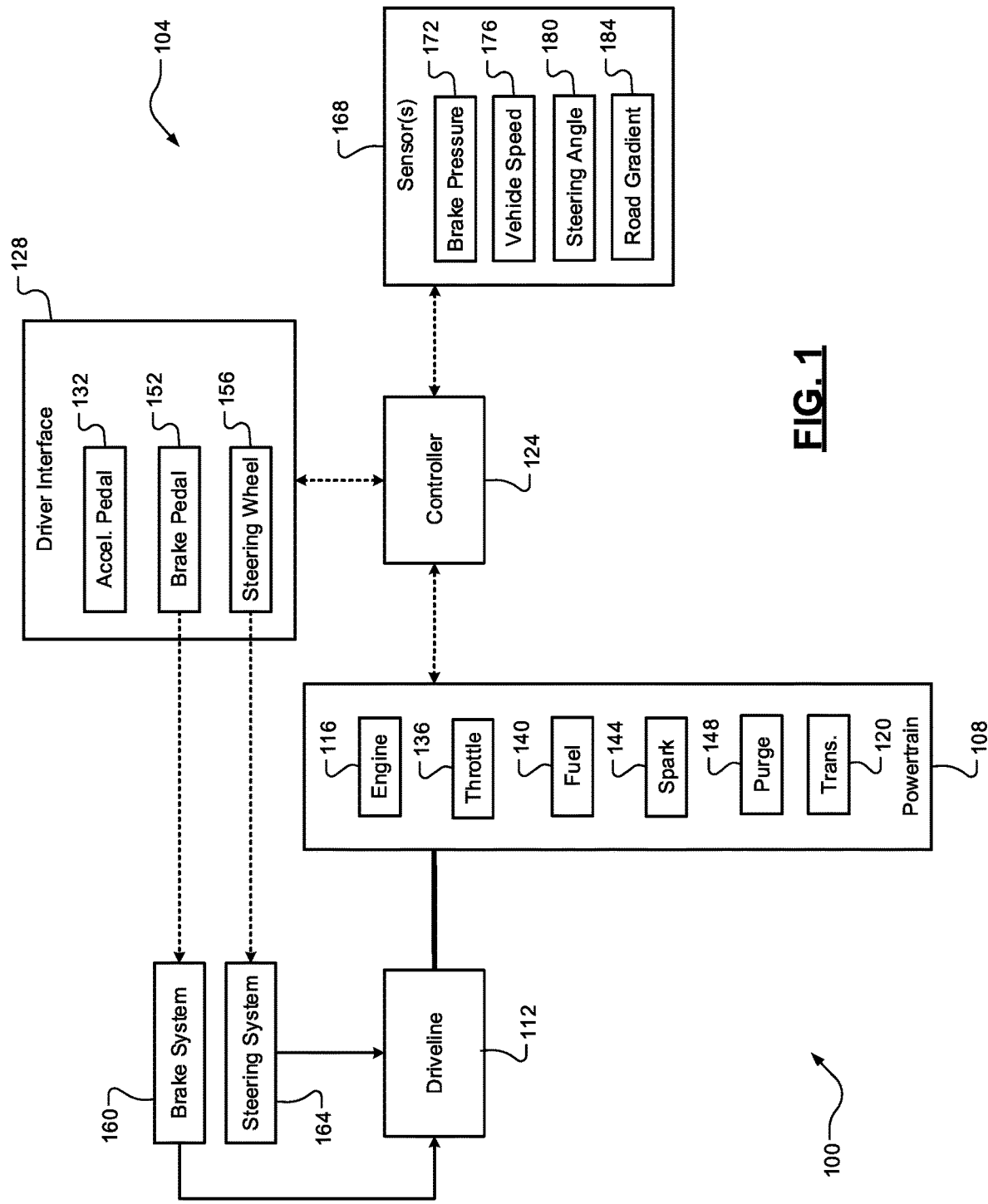
FIG. 1 is a functional block diagram of a vehicle having an example rolling engine start-stop (RESS) system according to the principles of the present application.

Referring now to FIG. 1, a functional block diagram of a vehicle 100 having an example RESS system 104 according to the principles of the present application is illustrated. The vehicle 100 generally comprises a powertrain 108 configured to generate and transfer drive torque to a driveline 112 for vehicle propulsion. The powertrain 108 generally comprises an engine 116 and a transmission 120, but it will be appreciated that the powertrain 108 could include other suitable components (e.g., an electric motor for engine start operations). The vehicle 100 includes a controller 124 configured to control operation of the vehicle 100, including, but not limited to, controlling the powertrain 108 to generate a desired amount of drive torque to satisfy a driver torque request via a driver interface 128 (e.g., an accelerator pedal 132). This could include, for example, controlling one or more of a throttle valve 136, fuel system 140, spark system 144, and purge system 148 of the engine 116, and/or the transmission 120 (e.g., a gear ratio).

The driver interface 128 can include other suitable components that are manipulated by the driver to control the vehicle 100, including, but not limited to, a brake pedal 152 and a steering wheel 156. The brake pedal 152 controls a brake system 160 to selectively provide braking force at the driveline 112. Similarly, the steering wheel 156 controls a steering system 164 to selectively control steering or a turn angle of the driveline 112. A set of one or more sensors 168 provide measurements to the controller 124 indicative of various vehicle operating parameters. Non-limiting examples of the set of sensor(s) 168 include a brake pedal position/pressure sensor 172, a vehicle speed sensor 176, a steering angle sensor 180, and a road gradient sensor 184. The controller 124 is configured to perform at least a portion of the RESS techniques of the present application, which will now be described in greater detail.

If the driver intention to stop is known based on inputs like vehicle speed, deceleration rate, and accelerator and/or brake pedal modulation, the engine 116 is allowed to shutdown (revolutions per minute, or RPM=0) prior to the vehicle 100 coming to stop (miles per hour, or MPH=0) at lower vehicle speeds (0 to 1.5 mph) and higher vehicle speeds (up to 4 mph). The present application proposes a method to estimate dynamic entry speed threshold for RESS considering NVH, deceleration impact, stop probability and previous RESS event, so as to achieve engine shutdown fuel shut-off (FSO) at a target vehicle speed. The target vehicle speed could be predetermined based on various enable conditions based on inputs like brake pressure, steering wheel, accelerator pedal, road gradient, output shaft speed, and transmission gear. The proposed method aims at minimizing nuisance stops/start event by disabling RESS due to driver modulating the brake pedal or moving his/her steering wheel when he/she is coming to stop.

The application also proposes a method to schedule different actuators (throttle, fuel, spark, purge valve), idle speed control, and/or engine starter control to allow for shutdown once RESS is initiated based on estimated delays. Conventional engine shutdown approaches cannot be utilized for RESS and thus this application proposes a method to fill in the gap. Also, NVH studies have shown that driver braking and shutdown at different vehicle speeds have a huge impact on quality of shutdown and customer's perception of vehicle stop. Driver braking behavior also has an impact entry speeds for RESS. Based on different vehicle deceleration rates, jerk estimation and pre-positioning delays, we may need to initiate RESS at different vehicle speeds to achieve a good quality shutdown with minimum jerk/NVH.

The target vehicle speed is predetermined when RESS is initiated based on various enable conditions as functions of inputs like brake pressure, steering wheel, accelerator pedal, road gradient, transmission output shaft (vehicle) speed, and transmission gear. The application determines dynamic speed to allow shutdown at this dynamically determined target vehicle speed based on kinematical equation considering deceleration rate and maximum actuator delay. The decision to start preparing for shutdown when vehicle speed reaches dynamic entry threshold is also based on driver's intention to stop probability. If stop probability is high, then RESS is allowed at dynamic threshold else it is allowed when vehicle speed reaches 0 mph. The application proposes a method to schedule different actuators (fuel, spark throttle, purge, lower idle speed and transmission) to allow engine shutdown based on individual estimated delays. To minimize the nuisance of a stop event during parking maneuvers, RESS is disabled based on integrated steering wheel angle (e.g., greater than a threshold indicative of a parking maneuver being performed). Steering wheel angle is integrated once the driver starts taking a turn and decremented to a lower value after completing the turn based on a calibratable rate which could be a function of distance covered after completing the turn.

Figure 2:
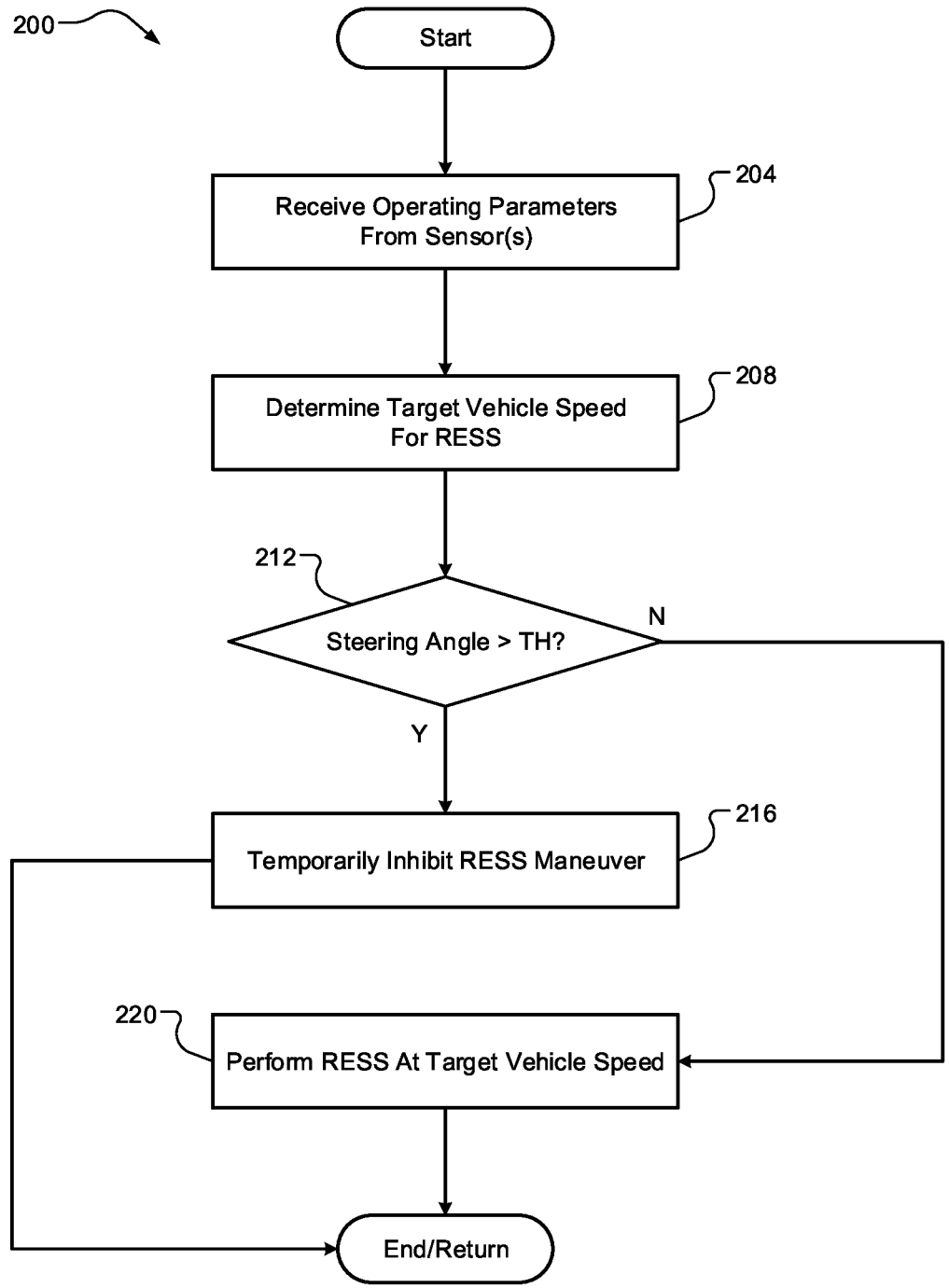
FIG. 2 is a flow diagram of a first example RESS method for a vehicle according to the principles of the present application.

Referring now to FIG. 2, a flow diagram of a first example RESS method 200 for a vehicle (e.g., vehicle 100) according to the principles of the present application is illustrated. While the method 200 specifically references the vehicle 100 and its components, it will be appreciated that the method 200 could be applicable to any suitable vehicle. At 204, the controller 124 provides the set of sensor(s) 168 and receives therefrom a set of operating parameters of the vehicle 100 comprising at least (i) driver input via the brake pedal 152, (ii) vehicle speed, and (iii) a steering angle of the vehicle 100. At 208, the controller 124 determines, based on the set of operating parameters, a target vehicle speed for stopping the engine 116 of the vehicle 100. At 212, the controller 124 determines whether the steering angle of the vehicle 100 is indicative of a parking maneuver in which case RESS may be inhibited. More specifically, this includes determining whether the steering angle exceeds a threshold value (TH). For example, during a vehicle parking maneuver, the vehicle 100 could be temporarily obstructed by an obstacle prior to reaching a desired final destination, and thus an RESS operation could be undesirable for the driver.

When true, the method 200 proceeds to 216 where RESS is inhibited and the method 200 ends or returns to 204. When false, however, the method 200 proceeds to 220 where the controller 124 stops the engine 116 of the vehicle 100 when the vehicle speed falls to the determined target vehicle speed. As previously discussed, this determined target vehicle speed could be predetermined (4 mph, 2 mph, 0 mph, etc.) or dynamically determined based on other criteria/parameters (e.g., driver pedal modulation, road gradient, etc.). For example, this target vehicle sped could be dynamically determined based on a kinematic equation considering vehicle deceleration rate and maximum delays of a set of actuators (120, 136-148) for stopping the engine 116. For example, this could include scheduling, by the controller 124, at least some of the set of actuators to allow stopping of the engine at the dynamically determined target vehicle speed based on individual estimated delays of the set of actuators. In stopping the engine of the vehicle 100 at the determined target vehicle speed, NVH caused by stopping the engine 116 is mitigated or eliminated. The method 200 then ends or returns to 204.

Figure 3:
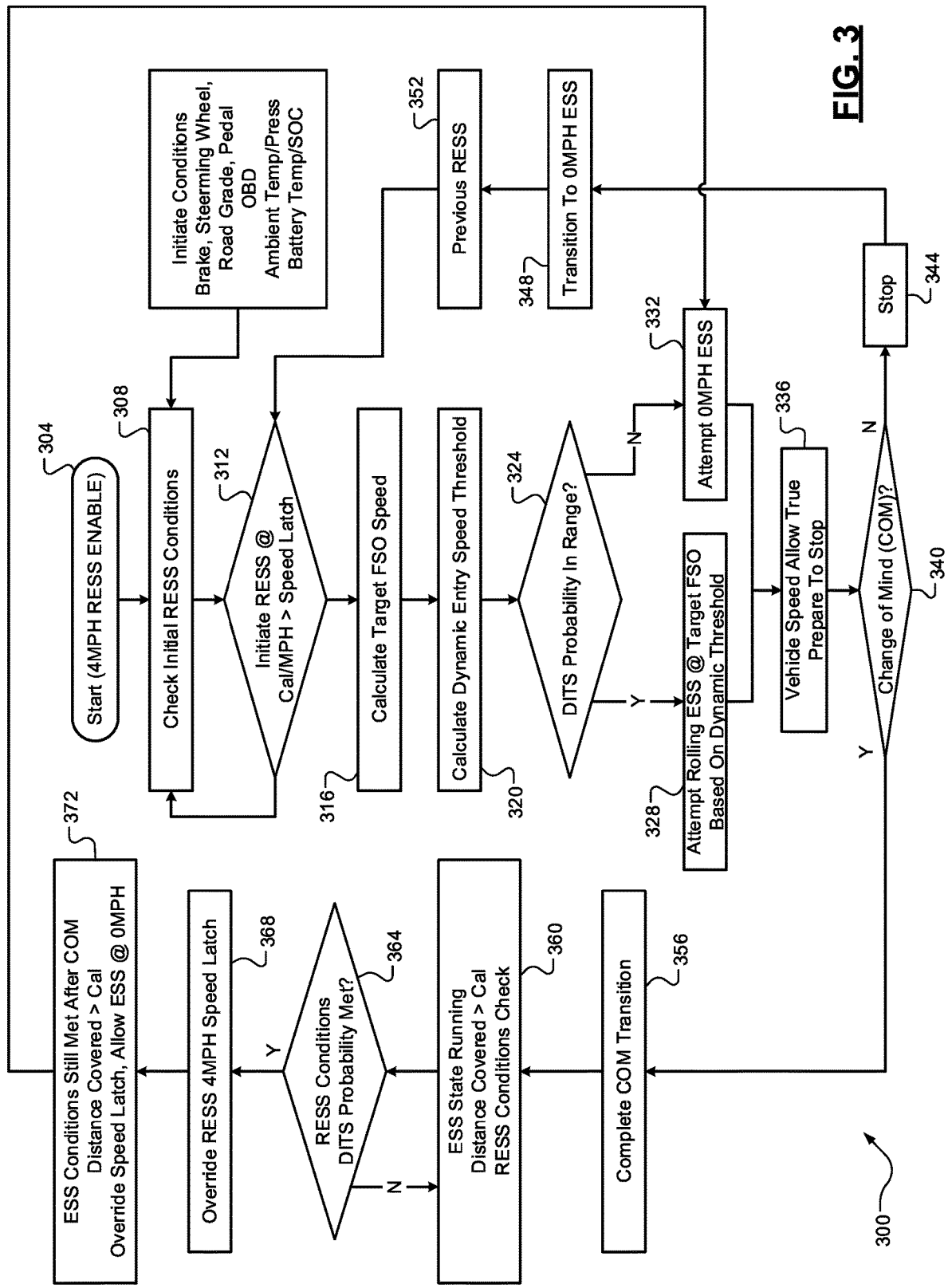
FIG. 3 is a flow diagram of a second, more specific example RESS method for a vehicle according to the principles of the present application.

Referring now to FIG. 3, a flow diagram of a second, more specific example RESS method 300 for a vehicle (e.g., vehicle 100) according to the principles of the present application is illustrated. While the method 300 specifically references the vehicle 100 and its components, it will be appreciated that the method 300 could be applicable to any suitable vehicle. At 304, the method 300 begins with a 4 MPH RESS enabled. At 308, initial RESS conditions are checked. This could include, for example, initiate conditions such as brake, steering wheel, rolling grade, pedal, OBD, ambient temperature/pressure, and battery temperature/SOC from 310. At 312, RESS is initiated at a calibration/MPH greater than the speed latch. If this fails, the method 300 returns to 308. Otherwise, the method 300 proceeds to 316 where the target FSO speed is calculated and then the dynamic entry speed threshold is calculated at 320. At 324, it is determined whether the DITS probability is within an acceptable range.

When true, the method 300 proceeds to 328; otherwise, the method 300 proceeds to 332. At 328, rolling ESS at the target FSO speed based on the dynamic threshold is attempted and the method 300 proceeds to 336. At 332, a 0 MPH is attempted. At 336, the vehicle speed allowed is true and the vehicle prepares to stop. At 340, it is determined whether a driver change of mind (COM) has occurred. When false, the method 300 proceeds to 344; otherwise, the method 300 proceeds to 356. At 344, the procedure stops and at 348 a transition to a 0 MPH ESS is performed. At 352, the previous RESS is determined, and the method 300 returns to 312. At 356, the COM transition is completed. At 360, the ESS state is running, the distance covered is greater than a calibration, and the RESS conditions are checked. At 364, it is determined whether the RESS conditions DITS probability is met. If false, the method 300 returns to 360; otherwise, the method 300 proceeds to 368. At 368, the RESS 4 MPH speed latch is overridden. At 372, it is determined that the ESS conditions are still met after the COM, the distance covered being greater than the calibration, and the speed latch being overridden allowing ESS at 0 MPH. The method 300 then returns to 332.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A rolling engine start-stop (RESS) system for a vehicle, the system comprising:
   a set of sensors configured to measure a set of operating parameters of the vehicle comprising at least (i) driver input via brake pedal of the vehicle, (ii) vehicle speed, and (iii) a steering angle of the vehicle; and
   a controller configured to:
      based on the set of operating parameters, determine a target vehicle speed for stopping an engine of the vehicle, wherein the target vehicle speed is determined dynamically based on a kinematic equation considering vehicle deceleration rate and maximum delays of a set of actuators for stopping the engine; and
      based on the steering angle of the vehicle, selectively stopping the engine of the vehicle when the vehicle speed falls to the determined target vehicle speed,
      wherein stopping the engine of the vehicle at the determined target vehicle speed decreases noise/vibration/harshness (NVH) caused by stopping the engine.

2. The system of claim 1, wherein the controller is configured to not stop the engine of the vehicle when the steering angle of the vehicle exceeds a steering angle threshold.

3. The system of claim 2, wherein the steering angle threshold is indicative of a vehicle parking maneuver.

4. The system of claim 1, wherein the controller is configured to schedule the set of actuators to allow stopping of the engine at the dynamically determined target vehicle speed based on individual estimated delays of the set of actuators.

5. The system of claim 4, wherein the set of actuators comprise at least one of (i) fuel, (ii) spark, (iii) throttle, (iv) purge, (v) engine idle speed, (vi) and transmission state.

6. The system of claim 1, wherein the target vehicle speed is further determined by selecting one of a plurality of predetermined target vehicle speeds.

7. The system of claim 6, wherein the plurality of predetermined target vehicle speeds comprises (i) four miles per hour, (ii) two miles per hour, and (iii) zero miles per hour.

8. The system of claim 1, wherein the driver input via the brake pedal of the vehicle comprises (i) a brake pedal pressure/position and (ii) a rate of change of the brake pedal pressure/position.

9. A rolling engine start-stop (RESS) method for a vehicle, the method comprising:
- providing a set of sensors configured to measure a set of operating parameters of the vehicle comprising at least (i) driver input via brake pedal of the vehicle, (ii) vehicle speed, and (iii) a steering angle of the vehicle;
- based on the set of operating parameters, determining, by a controller of the vehicle, a target vehicle speed for stopping an engine of the vehicle, wherein the target vehicle speed is determined by selecting one of a plurality of predetermined target vehicle speeds; and
- based on the steering angle of the vehicle, selectively stopping, by the controller, the engine of the vehicle when the vehicle speed falls to the determined target vehicle speed,
- wherein stopping the engine of the vehicle at the determined target vehicle speed decreases noise/vibration/harshness (NVH) caused by stopping the engine.

10. The method of claim 9, wherein selectively stopping the engine of the vehicle comprises not stop the engine when the steering angle of the vehicle exceeds a steering angle threshold.

11. The method of claim 10, wherein the steering angle threshold is indicative of a vehicle parking maneuver.

12. The method of claim 10, wherein the target vehicle speed is further determined dynamically based on a kinematic equation considering vehicle deceleration rate and maximum delays of a set of actuators for stopping the engine.

13. The method of claim 12, wherein stopping the engine of the vehicle comprises scheduling, by the controller, the set of actuators to allow stopping of the engine at the dynamically determined target vehicle speed based on individual estimated delays of the set of actuators.

14. The method of claim 13, wherein the set of actuators comprise at least one of (i) fuel, (ii) spark, (iii) throttle, (iv) purge, (v) engine idle speed, (vi) and transmission state.

15. The method of claim 9, wherein the plurality of predetermined target vehicle speeds includes zero miles per hour and at least one positive vehicle speed.

16. The method of claim 15, wherein the plurality of predetermined target vehicle speeds comprises (i) four miles per hour, (ii) two miles per hour, and (iii) zero miles per hour.

17. The method of claim 9, wherein the driver input via the brake pedal of the vehicle comprises (i) a brake pedal pressure/position and (ii) a rate of change of the brake pedal pressure/position.

* * * * *